(12) United States Patent
Peppel (10) Patent No.: US 6,945,038 B2
(45) Date of Patent: Sep. 20, 2005

(54) METHOD AND APPARATUS FOR ENGAGING A TORQUE CONVERTER REACTION MEMBER

(75) Inventor: Jon Peppel, Statesville, NC (US)

(73) Assignee: Dana Corporation, Toledo, OH (US)

( * ) Notice: Subject to any disclaimer, the term of this patent is extended or adjusted under 35 U.S.C. 154(b) by 18 days.

(21) Appl. No.: 10/781,394

(22) Filed: Feb. 18, 2004

(65) Prior Publication Data

US 2005/0178112 A1  Aug. 18, 2005

(51) Int. Cl.[7] .............................................. F01K 13/00
(52) U.S. Cl. ...................................................... 60/345
(58) Field of Search .......................... 60/341, 345, 346; 192/41 R, 45.1

(56) References Cited

U.S. PATENT DOCUMENTS 5,718,114 A * 2/1998 Murata et al. ................ 60/345
5,852,932 A   12/1998 Matsumoto

* cited by examiner

Primary Examiner—Thomas E. Lazo
(74) Attorney, Agent, or Firm—Marshall & Melhorn LLC.

(57) ABSTRACT

A method and apparatus for selectively engaging a torque converter reaction member comprising a reaction member carrier coupling sleeve, a stator support coupling sleeve and a pawl mounted on the reaction member carrier coupling sleeve. The pawl selectively engages the stator support coupling sleeve to align a first set of coupling teeth on the reaction member carrier coupling sleeve and a second set of coupling teeth on the stator support coupling sleeve.

20 Claims, 9 Drawing Sheets

METHOD AND APPARATUS FOR ENGAGING A TORQUE CONVERTER REACTION MEMBER

FIELD OF THE INVENTION

The present invention relates to a method and apparatus for engaging a torque converter reaction member comprising a reaction member carrier coupling sleeve, a stator support coupling sleeve and a pawl mounted on the reaction member carrier coupling sleeve.

BACKGROUND OF THE INVENTION

Sprag-type clutches are well known by those skilled in the art. These clutches are often used since they have a freewheel mode desirable to some. These clutches, however, have numerous disadvantages including very tight and expensive to manufacture tolerances that required for them to operate properly. For example, the diameter and concentricity of the races is required to be exact for the clutches to work. In addition, sprag-type clutches often have insufficient capacity, and the sprag is prone to skidding or flipping over, resulting in a history of poor durability for these clutches. Negative experiences in the industry with these clutches have led manufactures to cease offering freewheel clutches in the marketplace, with limited exceptions.

Other types of freewheel clutches are known to those skilled in the art. For example, U.S. Pat. Nos. 5,718,114 and 5,852,932 teach a mechanism comprising an outer race on an inner circumferential side of a stator. The outer race includes a first side face being formed with first teeth. The mechanism also comprises an unrotatable inner race assembled on a stationary shaft. The inner race includes a second side face, opposite the first side face, formed with second teeth which can prohibit the outer race from rotating in one direction by meshing with the first teeth. The inner and outer races move axially with fluid pressure so that the first teeth and second teeth can be engaged and disengaged. A structure to adequately align and initiate engagement of the first and the second teeth is absent from these inventions. As a consequence, excessive wear on the teeth, noise and/or vibration may result.

In light of the disadvantages found in the prior art, it is desirable to provide a robust, economical freewheel clutch that can be located within the confines of current torque converters.

SUMMARY OF THE INVENTION

The present invention is directed toward a mechanism for a torque converter comprising a pawl, a reaction member carrier coupling sleeve, and a stator support coupling sleeve supported for axial movement along a helical spine. Preferably, the reaction member carrier coupling sleeve comprises a first set of carrier coupling teeth and the stator support coupling sleeve comprises a second set of carrier coupling teeth for selectively engaging the first set of coupling teeth. The stator support coupling sleeve also comprises a plurality of indexing slots. Preferably, the pawl is pivotally mounted on the reaction member carrier coupling sleeve.

The present invention is also directed toward a method for selectively engaging a torque converter reaction member comprising providing the reaction member carrier coupling sleeve, locating the stator support coupling sleeve on a helical spline for axial movement, and selectively engaging the pawl into one of the plurality of indexing slots to engage the first set of coupling teeth and the second set of coupling teeth.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
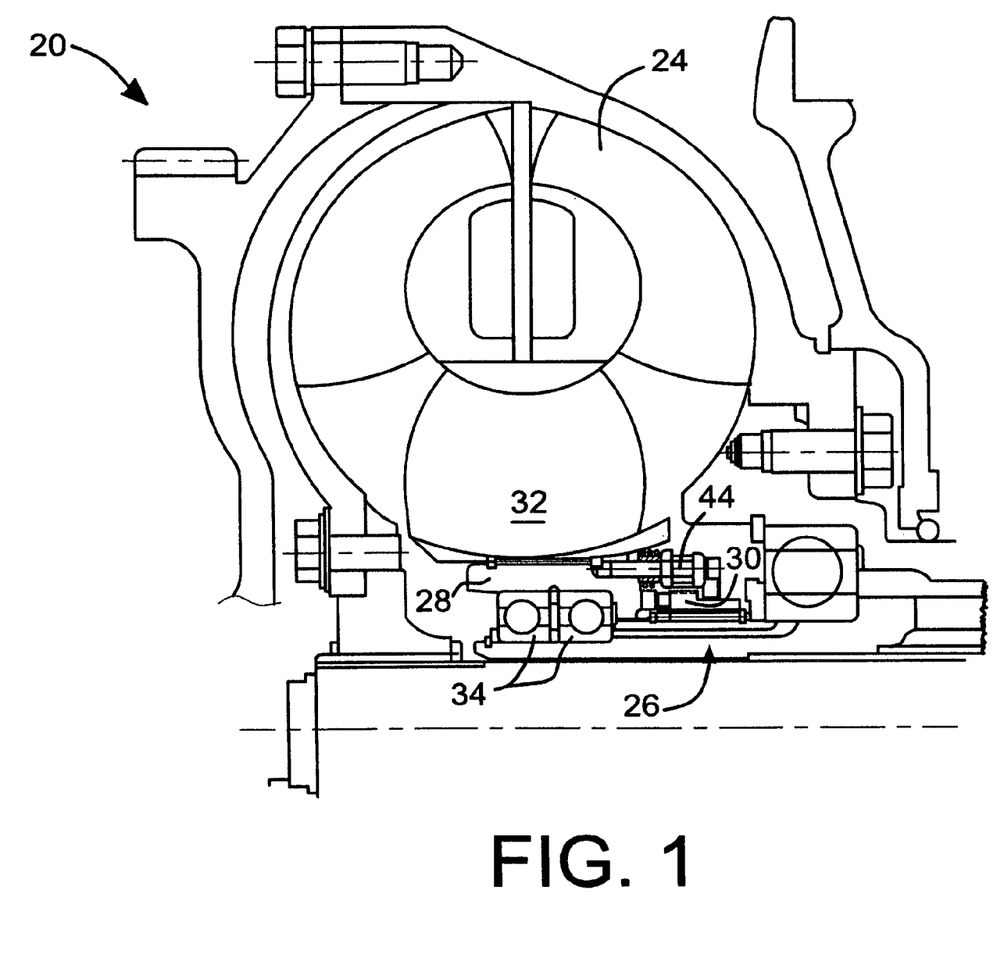
FIG. 1 is a partial side view of an embodiment of the present invention.
Figure 2:
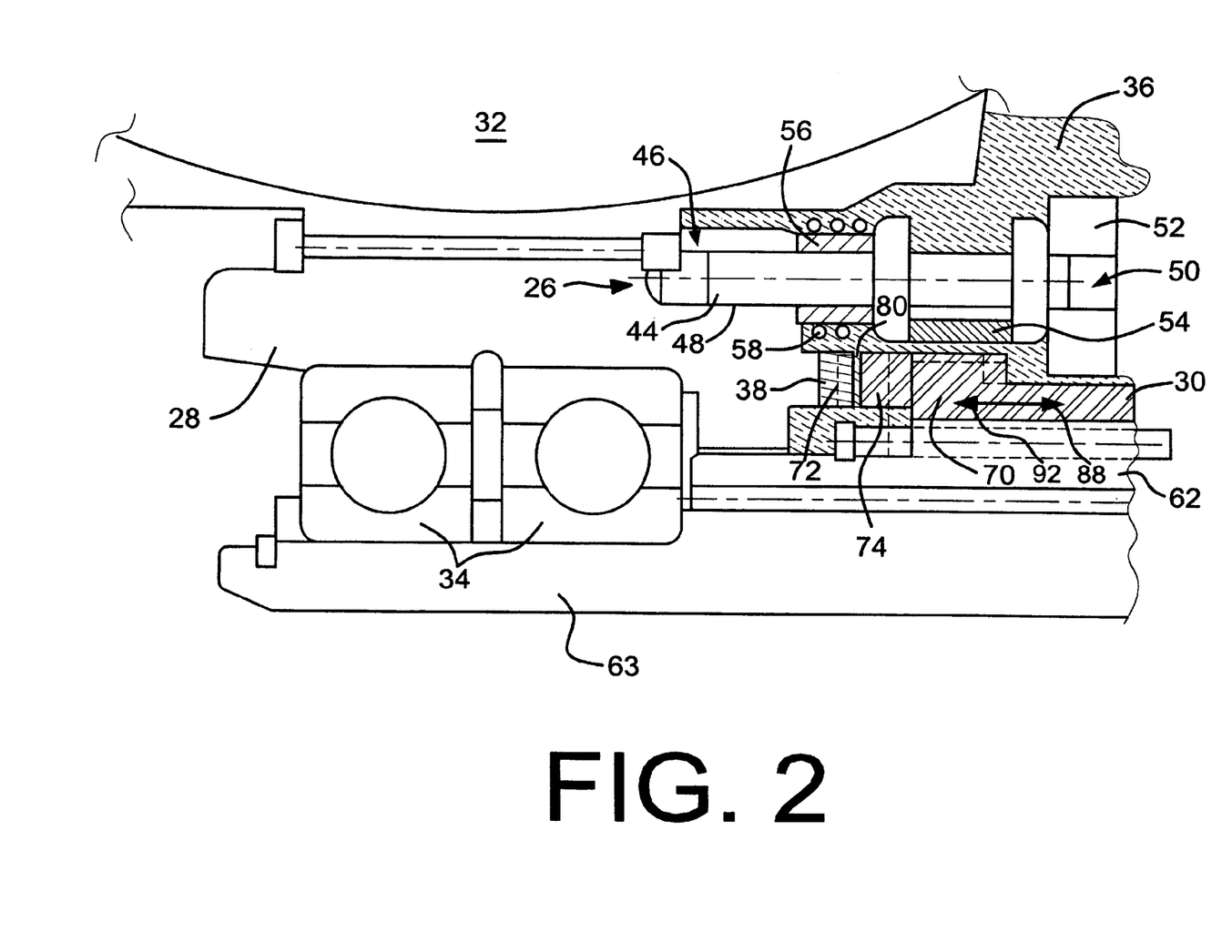
FIG. 2 is a detailed view of a portion of the invention depicted in FIG. 1.

Referring now to FIG. 1, a first half 20 of a torque converter assembly 24, as known to those skilled in the art, is depicted. As seen in FIGS. 1 and 2, a mechanism 26 for the torque converter assembly 24 is provided comprising a reaction member carrier coupling sleeve 28 and a stator support coupling sleeve 30. The reaction member carrier coupling sleeve 28 is connected to a torque converter reaction member 32, as known to those skilled in the art. At least two bearings 34 adjacent the reaction member carrier coupling sleeve 28 facilitate its rotation.

Preferably, a quantity of hydraulic fluid 36 is located among the reaction member carrier coupling sleeve 28 and the stator support coupling sleeve 30, as known to those skilled in the art.

As best seen in FIG. 2, the reaction member carrier coupling sleeve 28 is comprised of first set of coupling teeth 38. The first set of coupling teeth 38 may have any design known to those skilled in the art. In a preferred embodiment, however, the individual teeth of the first set of coupling teeth 38 have a curvilinear, or curvic, design.

A pawl pivot pin 44 is mounted in a predetermined location, described in more detail below, on the reaction member carrier coupling sleeve 28. Preferably, a first end 46 of the pawl pivot pin 44 is located in a hole 48 in the reaction member carrier coupling sleeve 28. A second end 50 of the pawl pivot pin 44 is located in a retainer plate 52. The retainer plate 52 is held in place by one or more mechanical fasteners (not shown), such as bolts, attached to the reaction member carrier coupling sleeve 28.

Preferably, a pawl 54 is pivotally mounted on the pawl pivot pin 44. A spacer 56 may be located on the pawl pivot pin 44 between the pawl 54 and the reaction member carrier coupling sleeve 28 to locate the pawl 54 in a position to engage the stator support coupling sleeve 30, described in more detail below.

Preferably, one or more coil springs 58 are placed in contact with the pawl 54 to bias it toward the stator support coupling sleeve 30. Although a coil spring 58 is depicted in FIG. 2, those skilled in the art will appreciate that other means to bias the pawl 54 may be used without departing from the scope of the present invention.

Figure 3:
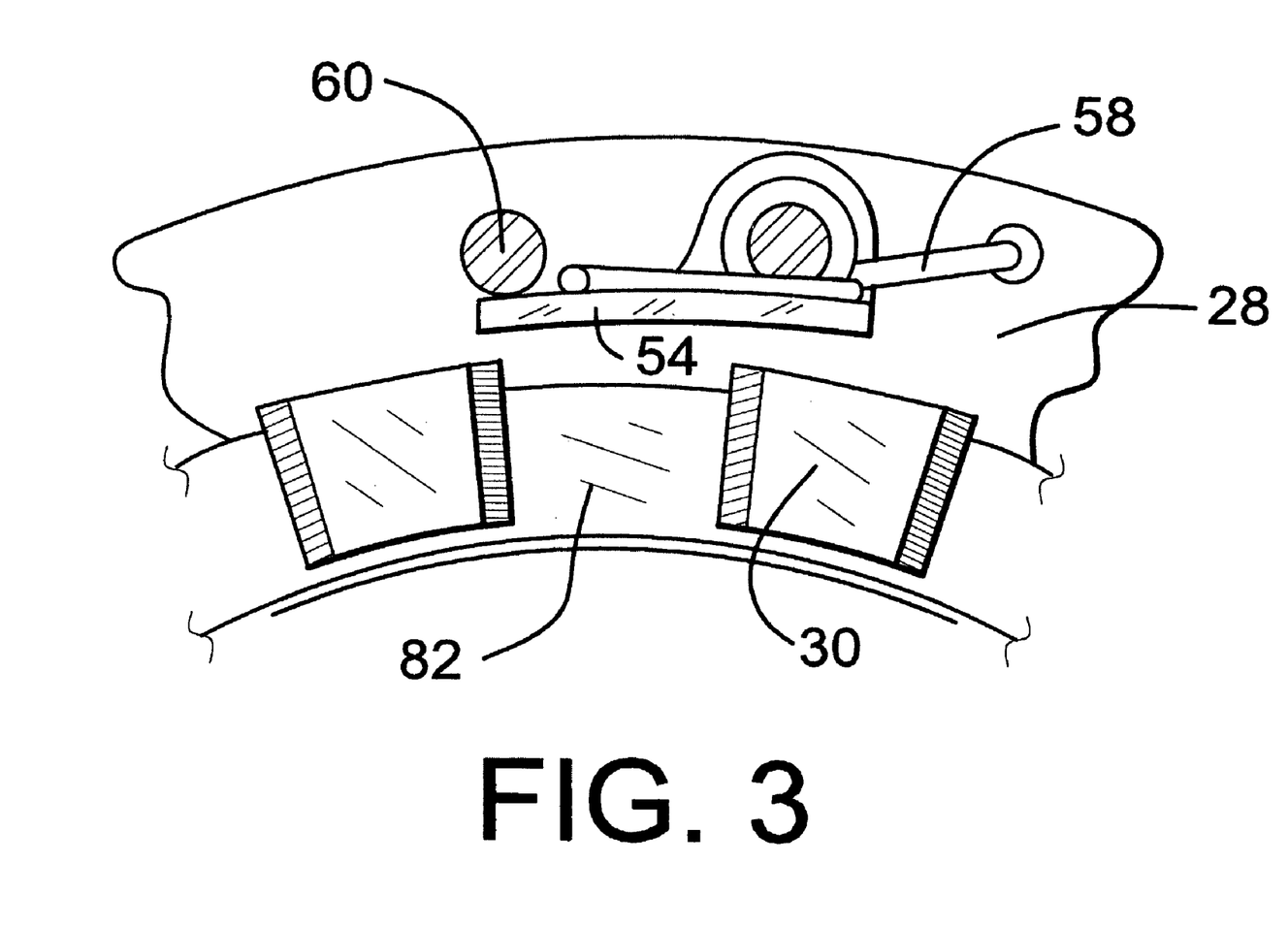
FIG. 3 is a partial view of a portion of the invention during one mode of operation as seen from the output side of the invention.

As depicted in FIG. 3, a stop 60 is preferably located on the reaction member carrier coupling sleeve 28 to prevent the pawl 54 from rotating beyond a predetermined distance from the stator support coupling sleeve 30. In FIG. 3, the stop 60 is depicted as a pin extending from the reaction member carrier coupling sleeve 28, however, any structure to prevent movement of the pawl 54 beyond a predetermined distance from the stator support coupling sleeve 30 may be used.

Figure 4:
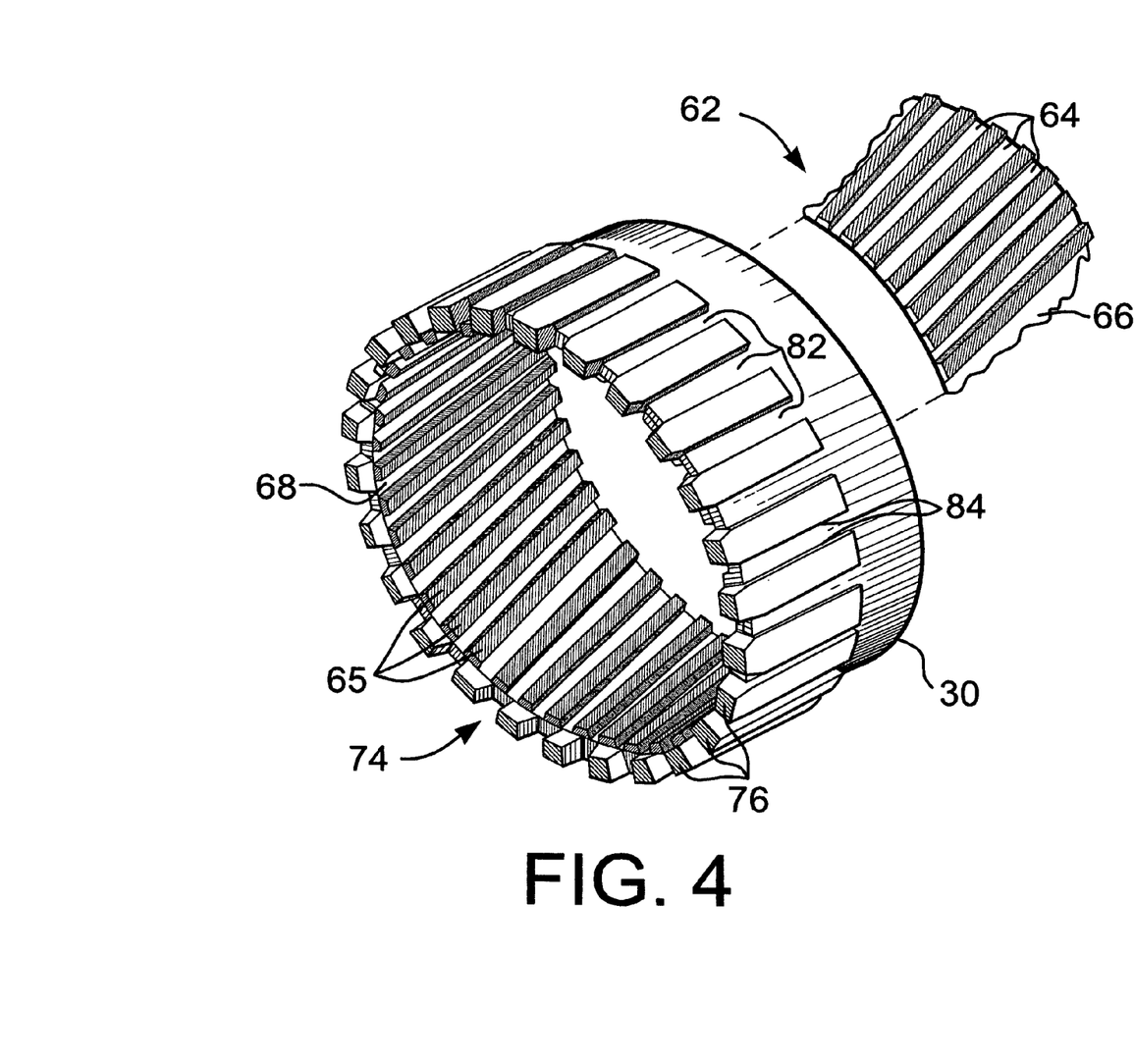
FIG. 4 is a perspective view of two components of the present invention.

Looking now at FIGS. 2 and 4, an inner splined sleeve 62 is provided on which the stator support coupling sleeve 30 is located. Preferably, the inner splined sleeve 62 comprises a plurality of helical splines 64 on its outside surface 66. An internal surface 68 of the stator support coupling sleeve 30 has a plurality of helical splines 65 complementary design to the plurality of helical splines 64. The inner splined sleeve 62 is located on a stator support 63.

Preferably, the plurality of helical splines 65 mesh with the plurality of helical splines 64 to allow the stator support coupling sleeve 30 to move in the axial direction while rotating at the same time. The stator support coupling sleeve 30 moves between a first axial position 70 to a second axial position 72 along the helical splines 64, 65, as best seen in FIG. 2.

As seen in FIGS. 2 and 4, the stator support coupling sleeve 30 preferably comprises a second set of coupling teeth 74 having a complementary design to the first set of coupling teeth 38. Preferably, individual teeth of the second set of coupling teeth 74 have a curvilinear, or curvic, design.

Looking now at FIG. 2, the first set of coupling teeth 38 and the second set of coupling teeth 74 selectively define a gap 80 between them. As described in more detail below, the first and second sets of coupling teeth 38, 74 vary the width of the gap 80 during various modes of operation of the mechanism 26, including one mode where the gap 80 is eliminated.

In the preferred embodiment depicted in FIG. 4, the stator support coupling sleeve 30 comprises a plurality of indexing slots 82. Each slot 82 is defined by at least two upstanding portions 84. Additional material may be added to the at least two upstanding portions 84 to extend them in the radial direction.

A preferred method of selectively engaging the torque converter reaction member 32 comprises rotating the reaction member carrier coupling sleeve 28, which carries the first set of coupling teeth 38. As known to those skilled in the art, hydraulic loads on the reaction member 32 cause it to rotate in the clockwise or counterclockwise direction. Rotation in the clockwise direction is referred to as the freewheel state and rotation in the counterclockwise direction is referred to as the loaded state. The reaction member carrier coupling sleeve 28 rotates with the reaction member 32.

The rotation of the first set of coupling teeth 38 in the counterclockwise direction during the loaded state produces a first hydraulic fluid force that acts on the stator support coupling sleeve 30 and urges it away from the reaction member carrier coupling sleeve 28. Preferably, the first hydraulic fluid force moves the stator support coupling sleeve 30 in a first axial direction 88 to disengage the first set of coupling teeth 38 and the second set of coupling teeth 74, as depicted in FIG. 2. During the loaded state, the first hydraulic fluid force is sufficient to maintain the first set of coupling teeth 38 and the second set of coupling teeth 74 in the disengaged position. In the disengaged position, the gap 80 between the sets of coupling teeth 38, 74 is present.

Preferably, the stator support coupling sleeve 30 moves in the first axial direction 88 while its helical spine 65 is rotationally engaged with the helical spine 64 of the inner splined sleeve 62.

Rotation of the reaction member 32 during the loaded state generates centrifugal and hydraulic fluid forces that rotate the pawl 54 against the spring 58 and into the stop 60 to prevent the pawl 54 from contacting the indexing slots 82 on the stator support coupling sleeve 30, as depicted in FIG. 3.

Figure 5:
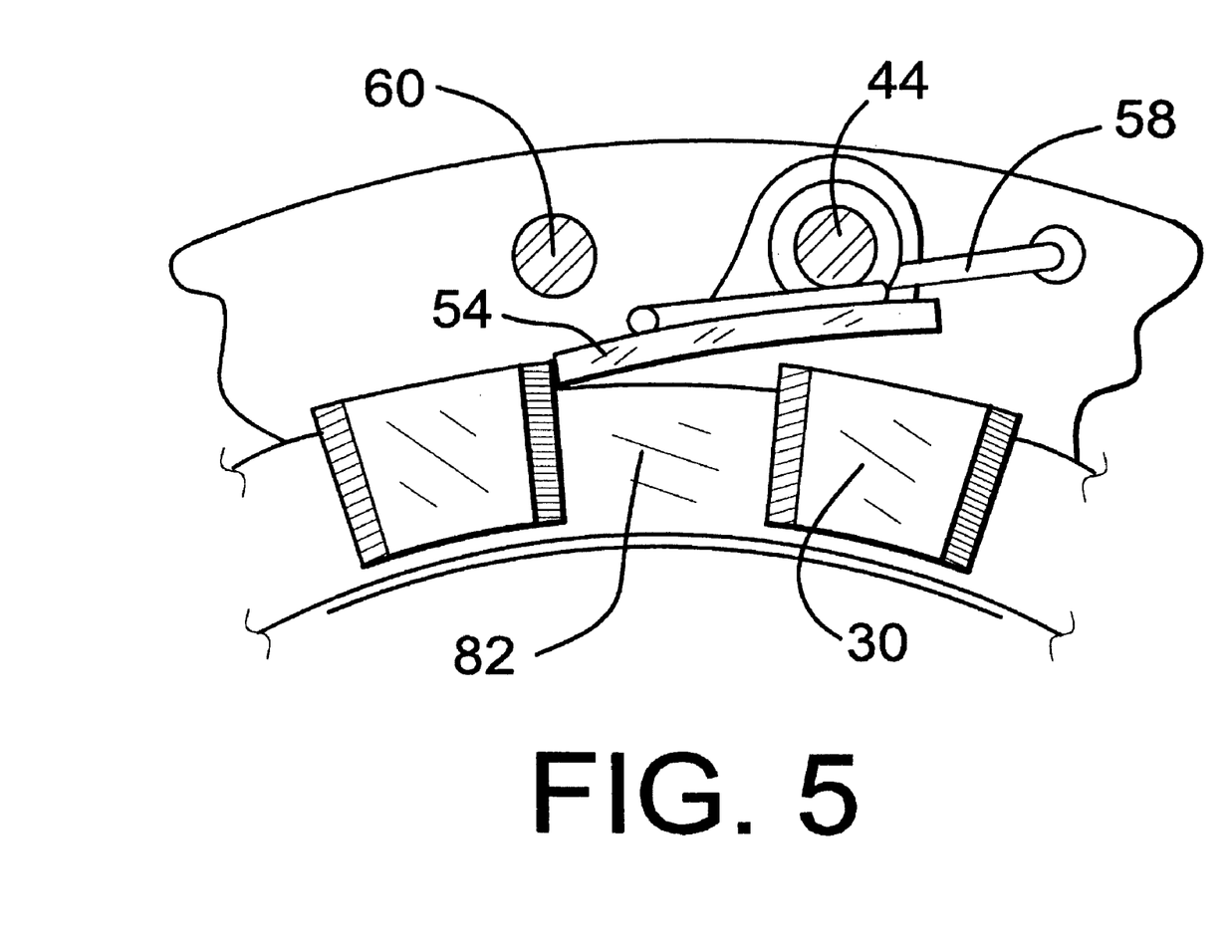
FIG. 5 is a partial view of a portion of the invention during another mode of operation as seen from the output side of the invention.

When the reaction member 32 rotates in the clockwise direction, the centrifugal and hydraulic fluid forces that rotated the pawl 54 against the stop 60 dissipate. The spring 58 urges the pawl 54 into contact with the stator support coupling sleeve 30. The reaction member 32 continues to rotate, carrying the pawl 54 with it. As the reaction member 32 rotates, the pawl 54 moves over the stator support coupling sleeve 30 until it enters one of the plurality of indexing slots 82. The reaction member 32 continues to move the pawl 54 within one of the plurality of indexing slots 82 until the pawl 54 contacts one of the upstanding portions 84, as depicted in FIG. 5. The upstanding portion prevents the pawl 54 from additional motion across the stator support coupling sleeve 30. The reaction member 32 continues to rotate. The pawl 54, engaged with the stator support coupling sleeve 30, drives the stator support coupling sleeve so that it rotates with the reaction member 30.

The plurality of helical splines 65 of the stator support coupling sleeve 30 are engaged with the plurality of helical splines 64 of the inner splined sleeve 62 to cause the stator support coupling sleeve 30 to move in the second axial direction 92 while the sleeve 30 rotates, as shown in FIG. 2. The second set of coupling teeth 74 on the stator support coupling sleeve 30 are brought closer to the second set of coupling teeth 74 and the gap 80 is gradually closed.

Figure 6:
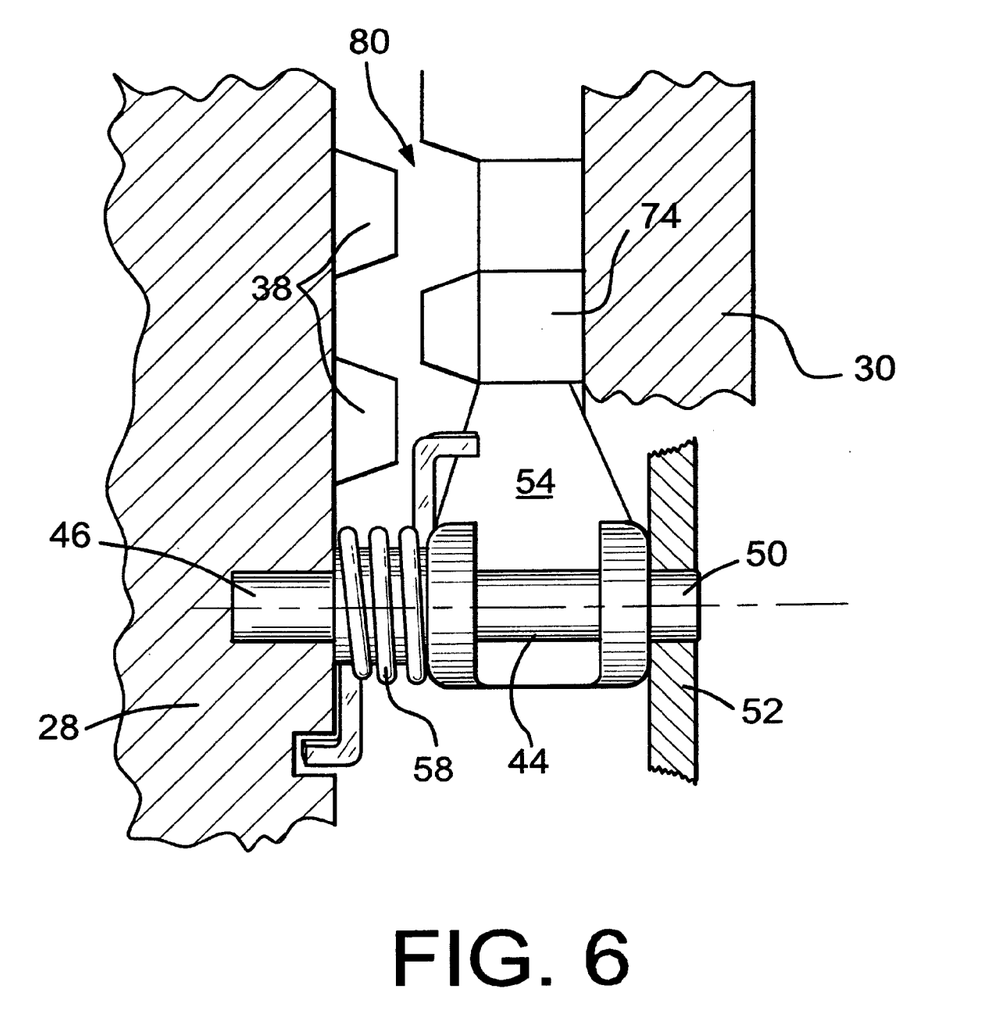
FIG. 6 is a top view of a portion of the invention depicted in FIG. 1.

The reaction member 32 and pawl 54 rotate the stator support coupling sleeve 30 to a pre-determined position in which the second set of coupling teeth 74 are in a complementary orientation with the first set of coupling teeth 38. More specifically, the second set of coupling teeth 74 are aligned between the first set of coupling teeth 38, as depicted in FIG. 6.

Figure 7:
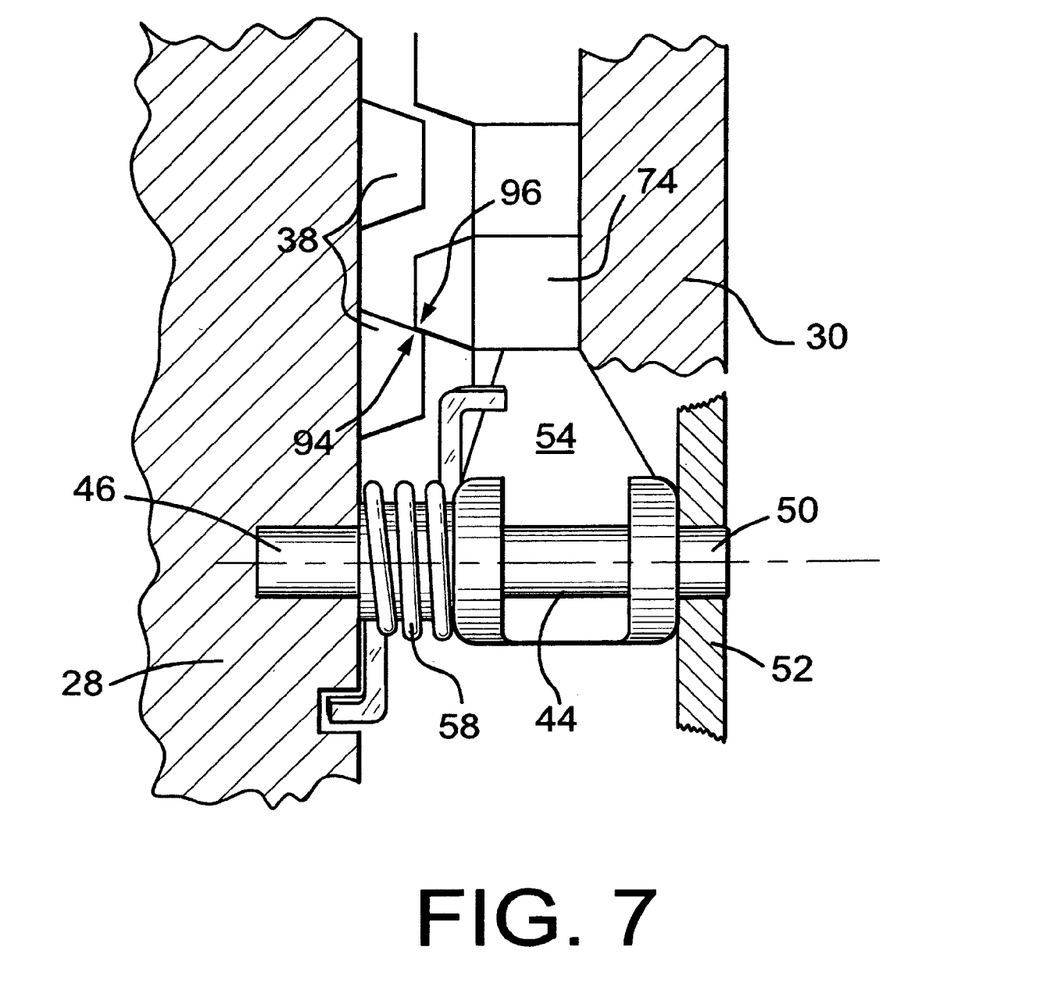
FIG. 7 is a top view of a portion of the invention depicted in FIG. 1 during another mode of operation of the invention.

As the stator support coupling sleeve 30 moves toward the reaction member 32, the first set of coupling teeth 38 and the second set of coupling teeth 74 make initial contact, as shown in FIG. 7. The initial contact is made between a first portion 94 of the first set of coupling teeth 38 and a first portion 96 of the second set of coupling teeth 74.

Figure 8:
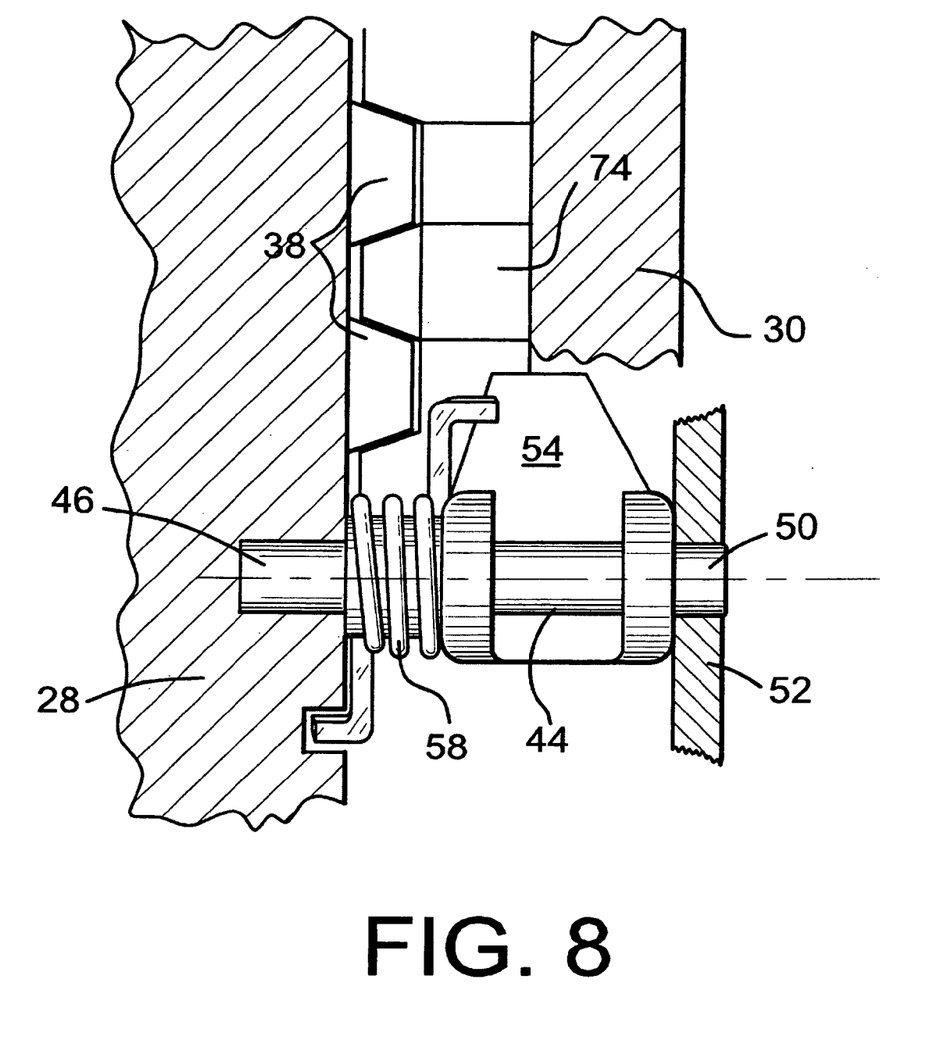
FIG. 8 is a top view of a portion of the invention depicted in FIG. 1 during operation of the invention.
Figure 9:
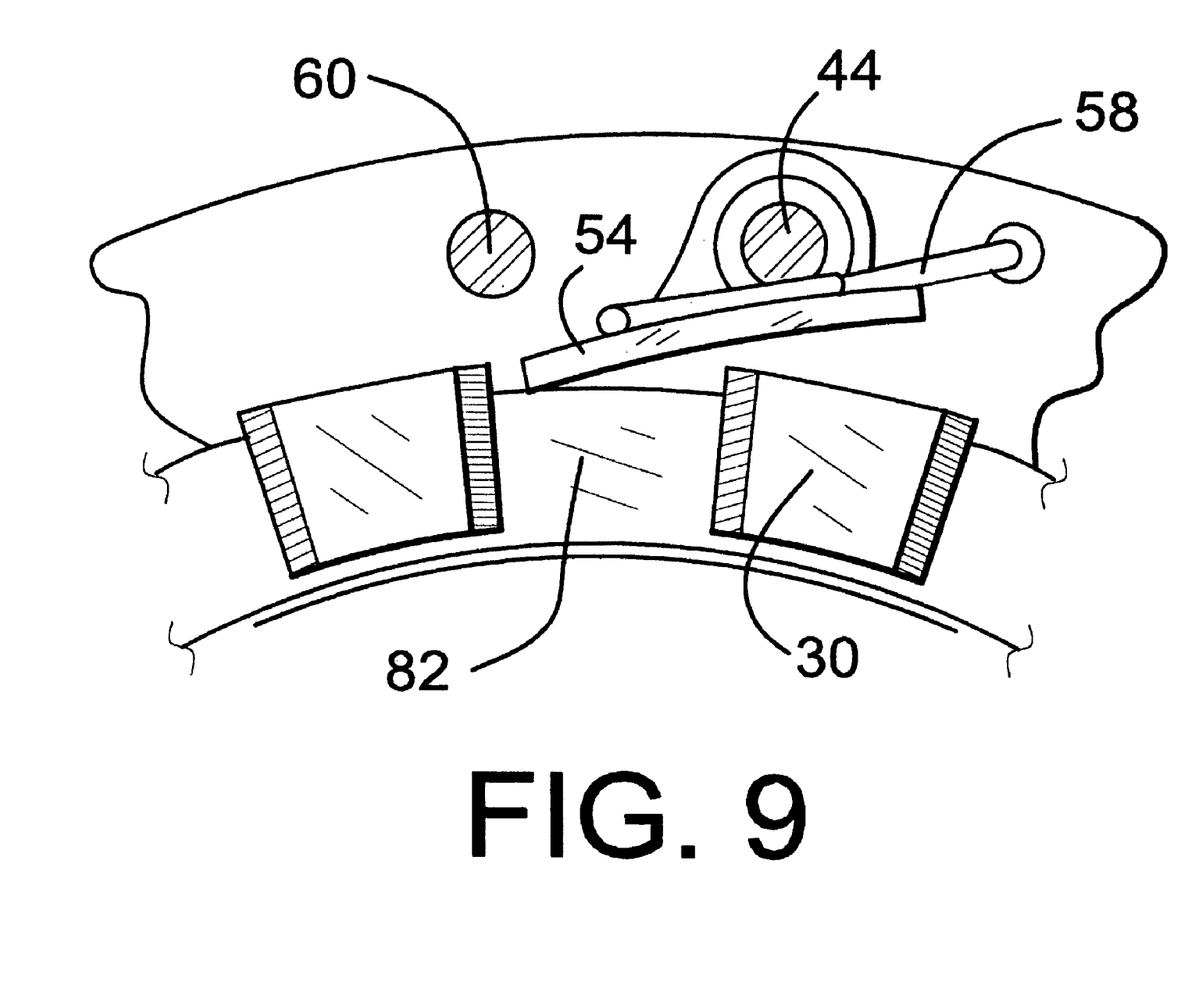
FIG. 9 is a partial view of a portion of the invention during yet another mode of operation as seen from the output side of the invention.

The pressure angle on the first and second sets of coupling teeth 38, 74 displaces the radial alignment between the reaction member coupling sleeve 28 and the stator support coupling sleeve 30, as depicted in FIG. 8. Displacing the radial alignment between the sleeves 28, 30, urges the pawl 54 out of engagement with the indexing slots 82 on the stator support coupling sleeve 30, as seen in FIG. 9.

The stator support coupling sleeve 30 continues to move in the second axial direction 92 causing the first and second set of coupling teeth 38, 74 to fully engage with each other. The fully engaged sets-of teeth 38, 74 lock the reaction member carrier coupling sleeve 28 to the stator support coupling sleeve 30 so that all the torque from the reaction member carrier coupling sleeve 28 is carried by the first and second sets of coupling teeth 38, 74. The pawl 54 disengages from the indexing slots 82 so that it no longer carries the torque load of the reaction member carrier coupling sleeve 28, as shown in FIG. 3. The above-described invention thus enables the torque converter assembly 24 to operate between the loaded and the freewheel state and vice versa.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A mechanism for a torque converter, comprising:
    a reaction member carrier coupling sleeve comprising a first set of coupling teeth;
    a stator support coupling sleeve supported for axial movement and comprising a second set of coupling teeth; and
    a pawl pivotally mounted on said reaction member carrier coupling sleeve for selectively engaging said second set of coupling teeth with said first set of coupling teeth.

2. The mechanism of claim 1, wherein said reaction member carrier coupling sleeve is connected to a torque converter reaction member.

3. The mechanism of claim 1, wherein at least one spring is in contact with said pawl to urge said pawl into said stator support coupling sleeve.

4. The mechanism of claim 1, wherein said first set of coupling teeth and said second set of coupling teeth are curvilinear.

5. The mechanism of claim 1, wherein said first set of coupling teeth and said second set of coupling teeth selectively define a gap between them.

6. The mechanism of claim 1, wherein said stator support coupling sleeve has a plurality of helical splines on an inner surface for rotating axial movement between a first axial position and a second axial position.

7. The mechanism of claim 1, wherein said plurality of helical splines of said stator support coupling sleeve meshes with a plurality of complementary helical splines on an inner splined sleeve.

8. The mechanism of claim 1, wherein said pawl is pivotally mounted on said reaction member carrier coupling sleeve by at least one pin.

9. The mechanism of claim 1, wherein said pawl selectively engages with one of a plurality of indexing slots on said stator support coupling sleeve.

10. The mechanism of claim 1, wherein at least one stop on said reaction member carrier coupling sleeve prevents movement of said pawl beyond a predetermined distance from said plurality of indexing slots.

11. A mechanism for a torque converter, comprising:
    a reaction member carrier coupling sleeve comprising a first set of coupling teeth;
    a stator support coupling sleeve supported for axial movement along a plurality of helical splines and comprising a plurality of indexing slots and a second set of coupling teeth for selectively engaging said first set of coupling teeth; and
    a pawl pivotally mounted on said reaction member carrier coupling sleeve for selective engagement with one of said plurality of indexing slots.

12. The mechanism of claim 11, wherein said stator support coupling sleeve selectively rotates along said plurality of helical splines to a first axial position where said pawl engages said indexing slots to align said first set of coupling teeth with said second set of coupling teeth.

13. A method for selectively engaging a torque converter reaction member, comprising:
    providing a reaction member carrier coupling sleeve comprising a first set of coupling teeth;
    locating a stator support coupling sleeve on a plurality of helical splines to selectively move said stator support coupling sleeve in an axial direction, said stator support coupling sleeve comprising a second set of coupling teeth; and
    selectively engaging a pawl with one of a plurality of indexing slots on said stator support coupling sleeve for selectively engaging said first set of coupling teeth and said second set of coupling teeth.

14. The method of claim 13, wherein a first hydraulic fluid force generated by said reaction member coupling sleeve rotates said stator support coupling sleeve in a first axial direction away from said reaction member carrier coupling sleeve.

15. The method of claim 13, wherein said pawl is positioned on said reaction member carrier coupling sleeve to engage one of said plurality of indexing slots on said stator support coupling sleeve to align said second set of coupling teeth with said first set of coupling teeth.

16. The method of claim 13, wherein said pawl is positioned on said reaction member carrier coupling sleeve to engage one of said plurality of indexing slots on said stator support coupling sleeve when said stator support coupling sleeve is located in a first axial position.

17. The method of claim 13, wherein a first portion of said first set of coupling teeth contact a first portion of said second set of coupling teeth creating an offset between said first set of coupling teeth and said second set of coupling teeth.

18. The method of claim 17, wherein said offset urges said pawl out of engagement with said plurality of indexing slots.

19. The method of claim 13, wherein said first set of coupling teeth and said second set of coupling teeth fully mesh to lock said reaction member carrier coupling sleeve and said stator support coupling sleeve together.

20. The method of claim 13, wherein said pawl engages one of said plurality of indexing slots to rotate said stator support coupling sleeve along a plurality of splines in a second axial direction toward said reaction member carrier coupling sleeve.

* * * * *